(12) United States Patent
Weller et al.

(10) Patent No.: US 11,617,308 B2
(45) Date of Patent: Apr. 4, 2023

(54) BALING APPARATUS

(71) Applicant: AGCO Corporation, Duluth, GA (US)

(72) Inventors: Lucas Andrew Weller, Hesston, KS (US); Richard Alexander, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 31 days.

(21) Appl. No.: 17/374,163

(22) Filed: Jul. 13, 2021

(65) Prior Publication Data
US 2022/0015299 A1 Jan. 20, 2022

Related U.S. Application Data

(60) Provisional application No. 63/052,569, filed on Jul. 16, 2020.

(51) Int. Cl.
*A01F 15/07* (2006.01)

(52) U.S. Cl.
CPC .... *A01F 15/0715* (2013.01); *A01F 2015/076* (2013.01)

(58) Field of Classification Search
CPC .............. A01F 2015/076; A01F 15/0715
USPC ............ 53/64, 116, 117, 118, 210, 211, 587, 53/389.2, 389.4; 200/61.17; 242/563
See application file for complete search history.

(56) References Cited

U.S. PATENT DOCUMENTS

| | | | |
|---|---|---|---|
| 2,195,394 A * | 4/1940 | Anderson | H04L 17/12 200/46 |
| 2,717,993 A * | 9/1955 | Newsom | B66D 1/40 254/326 |
| 2,745,633 A * | 5/1956 | Cornwell | B66D 1/40 116/68 |
| 4,922,683 A * | 5/1990 | Connolly | B65C 3/065 53/64 |
| 5,433,059 A | 7/1995 | Kluver et al. | |
| 5,996,307 A * | 12/1999 | Niemerg et al. | A01F 15/0715 53/118 |
| 6,651,408 B1 * | 11/2003 | McClure | A01F 15/0715 53/118 |
| 6,981,352 B2 | 1/2006 | Chow et al. | |
| 8,490,366 B1 | 7/2013 | Hintz | |
| 9,926,090 B2 * | 3/2018 | Ravaglia | A01F 15/0715 |
| 10,276,015 B2 | 4/2019 | Lang et al. | |
| 10,299,439 B2 * | 5/2019 | Simmons | A01F 15/0715 |
| 2002/0046552 A1 | 4/2002 | Huchet et al. | |

(Continued)

FOREIGN PATENT DOCUMENTS

| EP | 2816887 B1 * | 2/2017 | ......... A01F 15/0715 |
|---|---|---|---|
| EP | 3440924 A | 2/2019 | |

(Continued)

OTHER PUBLICATIONS

UK Intellectual Property Office, Search Report for related UK Application No. GB2011380.9, dated Jan. 21, 2021.

(Continued)

*Primary Examiner* — Stephen F. Gerrity

(57) ABSTRACT

A sensor arrangement located on a baler for detecting rotation of a dispensing reel of wrapping material and including a rotary element having a textured surface and a sensor mounted on a displaceable mounting bracket wherein the rotary element is rotated by the dispensing reel during baling.

11 Claims, 6 Drawing Sheets

(56) References Cited

U.S. PATENT DOCUMENTS

2005/0150992 A1\* 7/2005 Morris et al. .......... B65H 35/10
                                                                                          242/563
2012/0233962 A1   9/2012 Bennett et al.
2012/0240527 A1\* 9/2012 Herron ................ A01F 15/0715
                                                                                          53/64

FOREIGN PATENT DOCUMENTS

| JP | 01015225 A | \* | 1/1989 |
| JP | 05004765 A | \* | 1/1993 |
| JP | 2019110849 A | \* | 7/2019 |
| WO | 2015/035375 A1 | | 3/2015 |

OTHER PUBLICATIONS

European Patent Office, Search Report for related European Application No. EP21 17 8862, dated Dec. 13, 2021.

\* cited by examiner

BALING APPARATUS

CROSS-REFERENCE TO RELATED APPLICATIONS

This application claims the benefit of the filing date of U.S. Provisional Patent Application 63/052,569, filed Jul. 16, 2020, the entire disclosure of each of which is incorporated herein by reference.

FIELD OF THE INVENTION

The present invention relates to a baling apparatus and in particular to a baling apparatus for producing round bales.

BACKGROUND

A round bale forming apparatus picks up loose crop material from the ground, introduces the crop material into a bale forming chamber, forms from the crop material into a bale, wraps or binds at least one surface of the bale in the bale forming chamber into a web of wrapping material, and ejects the wrapped bale out of the bale forming chamber. Without wrapping the bale surface in the bale forming chamber the ejected bale would fall apart. While a problem in a bale forming and wrapping apparatus, this is a greater problem in a combination bale forming and wrapping machine in which a bound bale is transferred from the baling chamber to a wrapping table located behind the baling chamber. Accordingly, it is important that the operator of the baler can be confident that the web or wrapping material is flowing freely during wrapping or binding in the baling chamber. The present invention seeks to address these problems.

BRIEF SUMMARY

According to a first aspect of the present invention, a sensor arrangement for detecting rotation of a reel of wrapping material, comprises a displaceable mounting bracket, a rotary element mounted for rotation on the displaceable mounting bracket, the rotary element being provided with a textured surface and a sensor mounted on the displaceable mounting bracket for detecting rotation of the rotary element.

Preferably, the rotary element comprises one or more elements including an angled surface. More preferably, the angled surface is provided by a hemispherical element.

This has as an advantage that the rotary element may easily be displaced during loading of a reel of wrapping material.

Preferably the textured surface comprises one or more regions of surface patterning. More preferably, the surface patterning comprises one or more of a region of raised dots, raised ribs, knurling or dimpling.

Preferably the sensor arrangement further comprises a fixed mounting bracket supporting the displaceable mounting bracket for movement about an axis. More preferably a biasing element acts between the fixed and displaceable mounting brackets. Still more preferably, the biasing element biases the displaceable mounting bracket away from the fixed mounting bracket.

According to a second aspect of the present invention a baler comprises a receiving apparatus for receiving a reel of wrapping material, the receiving apparatus including a window and a sensor arrangement in accordance with the first aspect of the present invention, in which the rotary element extends through the window.

According to a third aspect of the present invention, a combination comprising an agricultural vehicle and a baler towed by the agricultural vehicle, in which the baler comprises a sensor arrangement in accordance with the first aspect of the present invention.

Preferably, the combination further comprises a control unit, a memory in communication with the control unit, and a user terminal in communication with the control unit, the control unit being configured to receive signals issued by the sensor, to compare the signals from the sensor against a set of values stored in the memory, to determine whether a terminal signal is to be generated and sent to the user terminal to cause the user terminal to generate an alert and as appropriate to send the terminal signal.

More preferably, the control unit is also configured to generate and send a baler signal to cause operation of the baler to cease when a terminal signal is generated and sent.

According to a fourth aspect of the present invention, a computer implemented method comprises the steps of a control unit receiving a plurality of signals, the signals including signals representing rotation of a rotary element, comparing the signals representative of the representing rotation of a rotary element against a set of values stored in the memory, and generating a terminal signal to a user terminal to cause the user terminal to generate an alert.

Preferably when a terminal signal is generated and sent, a baler signal is also generated and sent to cause operation of the baler to cease.

According to a fifth aspect of the present invention, a computer readable program comprises instructions that cause one or more processors to implement the method of the fourth aspect of the present invention.

BRIEF DESCRIPTION OF THE DRAWINGS

The invention will now be described, by way of example only, with reference to the accompanying drawings, in which.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
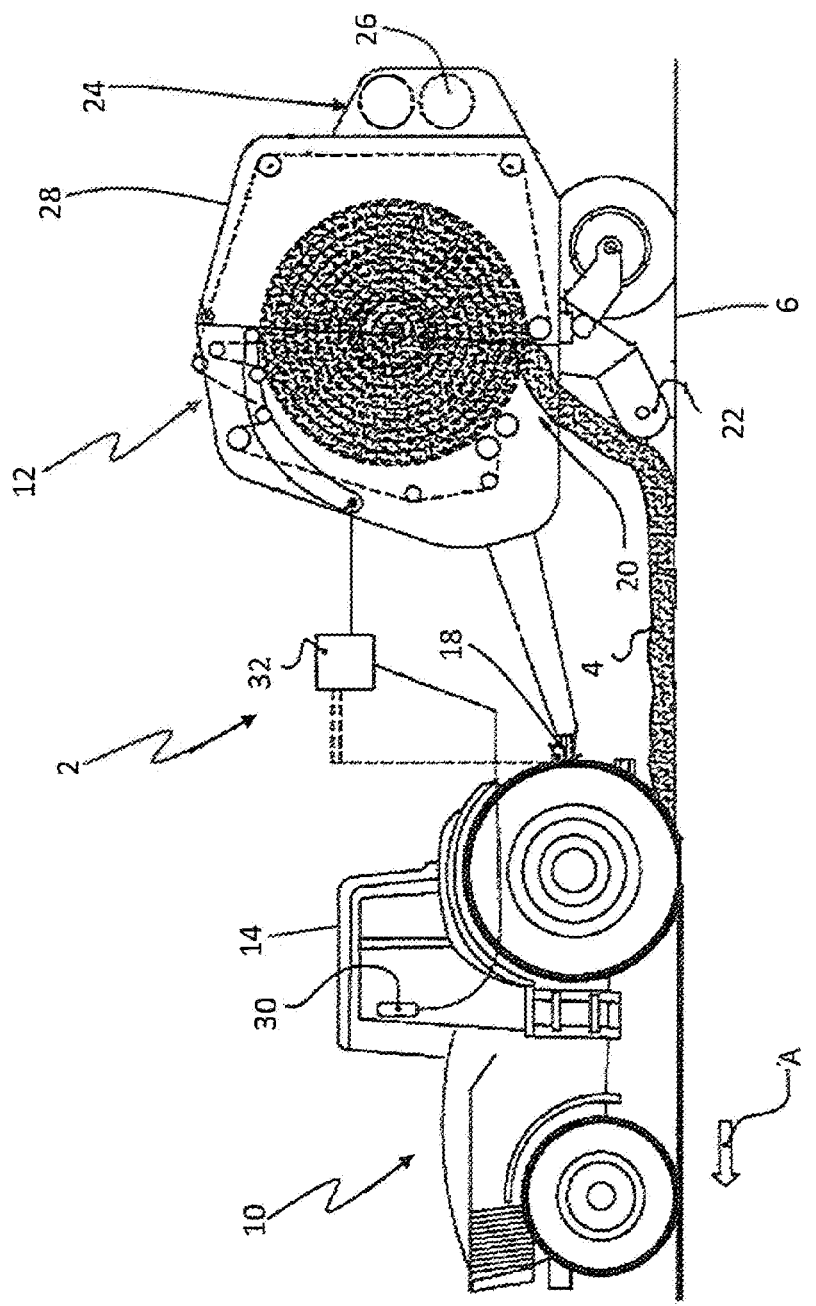
FIG. 1 shows a tractor and baler combination for use with the present invention.

Reference to terms such as longitudinal, transverse and vertical are made with respect to a longitudinal vehicle axis which is parallel to a normal forward direction of travel (arrow A, FIG. 1).

References to terms such as horizontal and vertical are made with respect to the apparatus being located on level, non-sloping ground.

FIG. 1 shows a semi-schematic diagram of an agricultural baler system 2 in which the invention may be employed while baling loose crop material 4 from the ground 6 into formed bales.

The baler system includes a towing vehicle 10 and a baler 12. The towing vehicle 10 may include a cab 14 wherein an operator may be located, an engine operable to move the towing vehicle, and a power take-off (PTO) 18 operable to transfer mechanical power from the engine to the baler 12. The baler 12 is hitched to the towing vehicle in any suitable manner, and power for operating the various mechanisms of the baler 12 may be supplied by the PTO 18 of the towing vehicle 10. One having ordinary skill in the art should appreciate in the context of the present disclosure that the example baler 12 is merely illustrative. While a variable chamber round baler is shown to illustrate the general principles of operation of a round baler, it will be understood that the invention is equally applicable to fixed chamber round baler.

The baler 12 has a baling chamber 20 within which bales of crop material are formed. The loose crop material 4 is picked up by a pickup assembly 22 and then introduced into the baling chamber 20. The baling chamber rotates the crop material to form a bale.

Once the bale has been formed the formed bale is bound by introducing a web of wrapping material into the baling chamber 20. The web of wrapping material is supplied from a wrapping material reservoir 24 to the baling chamber 20 by way of a transfer mechanism. Once the bale has been wrapped, the web of wrapping material is severed. The web of wrapping material is severed between the wrapping material reservoir 24 and the baling chamber 20. The baling chamber 20 continues to rotate to ensure the tail of the web of wrapping material is drawn in into the baling chamber and around the formed bale. Rotation of the baling chamber 20 is then ceased and a rear tailgate 28 opened to allow ejection of the formed bale. The tailgate 28 is then closed before continuing forward movement of the baler system and pick up of crop material for baling.

During wrapping the baler system may cease forward travel to prevent further crop material being introduced into the baling chamber. Alternatively or additionally the pick-up assembly may be disengaged for this purpose.

A user terminal 30 communicates with an electronic control unit 32. The user terminal is conveniently located within a cab of the towing vehicle. The electronic control unit 32 is also be in electronic or other communication with various components and devices of the baler (and/or the towing vehicle). Conveniently such communication may be enabled by way of a suitable data communication network 34 such as one compliant with the ISOBUS standard (a network in conformance to ISO 11783). For example, the electronic control unit 32 may be in electronic communication with various actuators, sensors, and other devices within (or outside of) the baler. The electronic control unit 32 may communicate with various other components (including other controllers) in various known ways, including wirelessly.

Various alternative locations for the electronic control unit may be utilized, including locations on the towing vehicle. It will be understood that one or more electronic control units may be employed and that the electronic control unit(s) 32 may be mounted at various locations on the towing vehicle, baler, or elsewhere. The electronic control unit(s) may be a hardware, software, or hardware and software computing device, and may be configured to execute various computational and control functionality with respect to the baler (or towing vehicle).

The electronic control unit 32 is also able to access a suitable memory 36. The memory 36 may take any suitable form and is in electronic communication with the electronic control unit 32. The memory 36 is adapted to store, in any suitable manner such as a database or look up table, reference values for a desired parameter.

The wrapping material located in the wrapping material reservoir 24 is in the form of a reel 26 of wrapping material. The reel 26 of wrapping material may be supported on lower surfaces of a wrapping material reservoir 24 or supported within the wrapping material reservoir 24 by stubs engaging with a central spindle 27 of the reel. In each case a free end of the wrapping material exits the wrapping material reservoir 24 and is delivered to a wrapping material delivery mechanism to allow controlled introduction of the wrapping material to the baling chamber 20.

As noted above, during the wrapping operation it is important that the wrapping material continues to be delivered to the baling chamber 20. A number of sensor arrangements are known to monitor the delivery of the wrapping material to the baling chamber 20. It is a problem with a number of these arrangements that they need to be reset on each occasion that a new reel 26 of wrapping material is introduced to the wrapping material reservoir 24. For example the sensor arrangement might be located in the pathway needed by an operator to introduce a new reel 26 of wrapping material into the wrapping material reservoir requiring the operator first to move the sensor arrangement before then introducing the new reel 26 of wrapping material and subsequently resetting the sensor arrangement once the new reel of wrapping material is in position.

Figure 2:
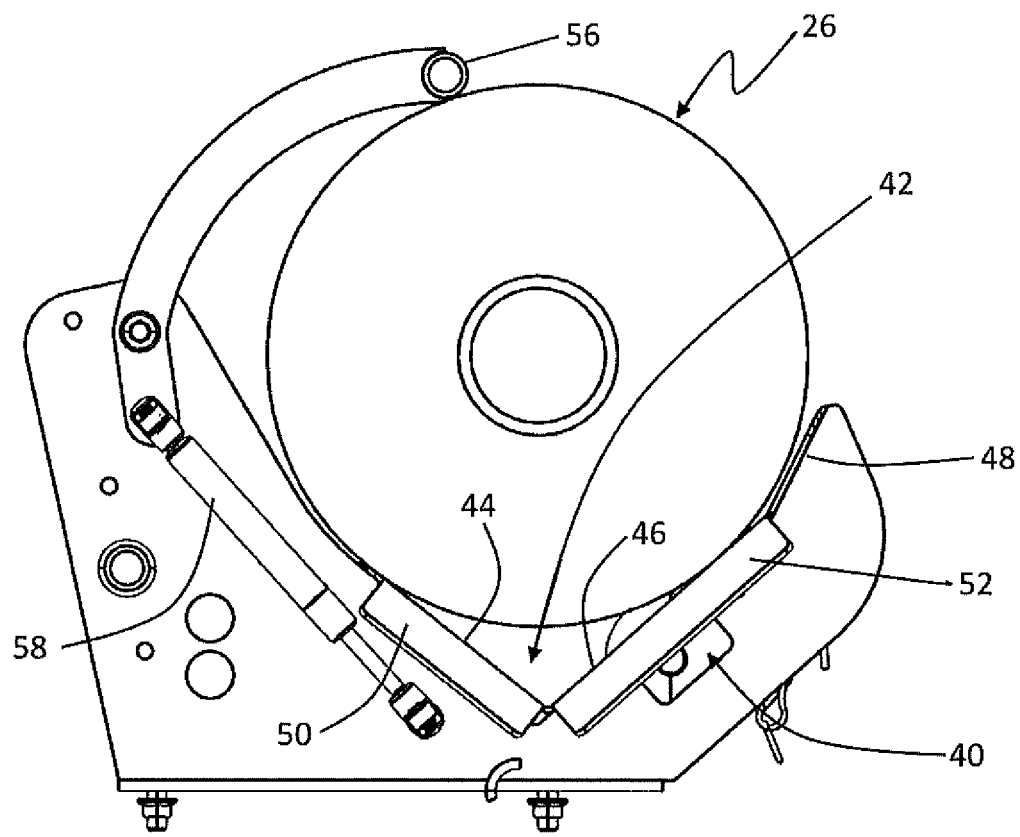
FIG. 2 shows a side view of elements of a wrapping material reservoir together with a sensor arrangement in accordance with the present invention in a first position.

Referring now to FIGS. 2 to 6, a sensor arrangement 40 in accordance with the present invention is shown. FIG. 2 shows a side view of a cradle 42 within the wrapping material reservoir 24. It can be seen that the cradle 42 comprises first and second surfaces 44,46 for supporting the reel 26 of wrapping material. A third surface 48 at the free end of the second surface provides a lip to the cradle (see also FIG. 6).

At the ends side flanges 50,52 are provided at an angle to the first and second surfaces 44,46 to aid in the introduction and removal of the reel 26 of wrapping material from the wrapping material reservoir 24 by an operator.

In FIG. 2, the sensor arrangement 40 is shown in a first position in which the sensor arrangement 40 extends through a window 54 in the second surface 46 of the cradle 42 to contact an outer surface of the reel 24 of wrapping material. The reel is urged downward in the cradle by guide means. The guide means conveniently comprises a crossbar 56 operated by way of actuators 58 located to each side of the wrapping material reservoir 24.

Figure 3:
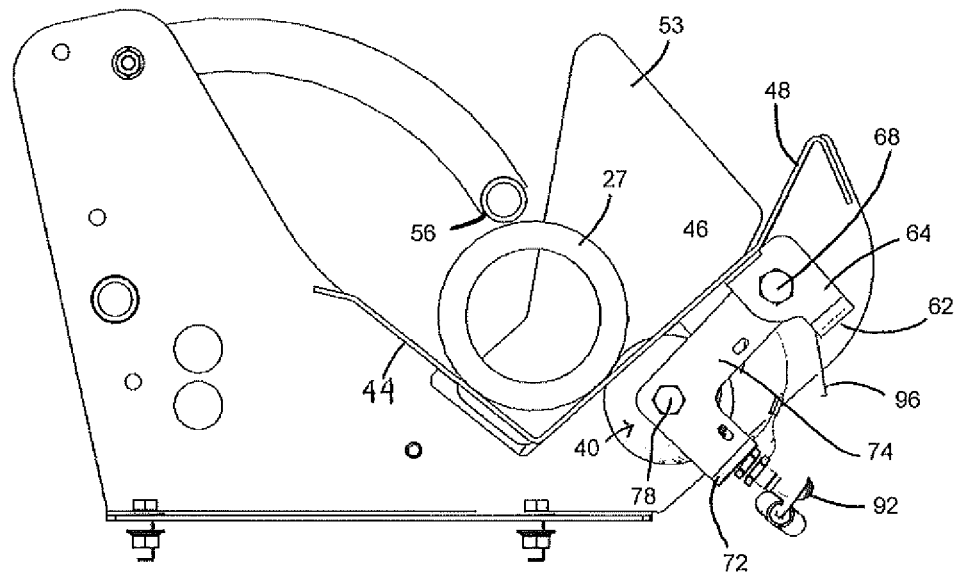
FIG. 3 shows a sectional view of elements of the wrapping material reservoir and the sensor arrangement with the sensor arrangement in a second position.

In FIG. 3, the sensor arrangement 40 is shown in a second position corresponding to the position adopted once a supply of wrapping material has been exhausted from the central spindle 27 of the reel of wrapping material. FIG. 3 also shows an end plate 53 against which an end of the reel 26 of wrapping material (or an end of the central spindle 27) can abut to ensure the correct placement of the of the reel of wrapping material when loaded into the cradle 42.

Figure 4:
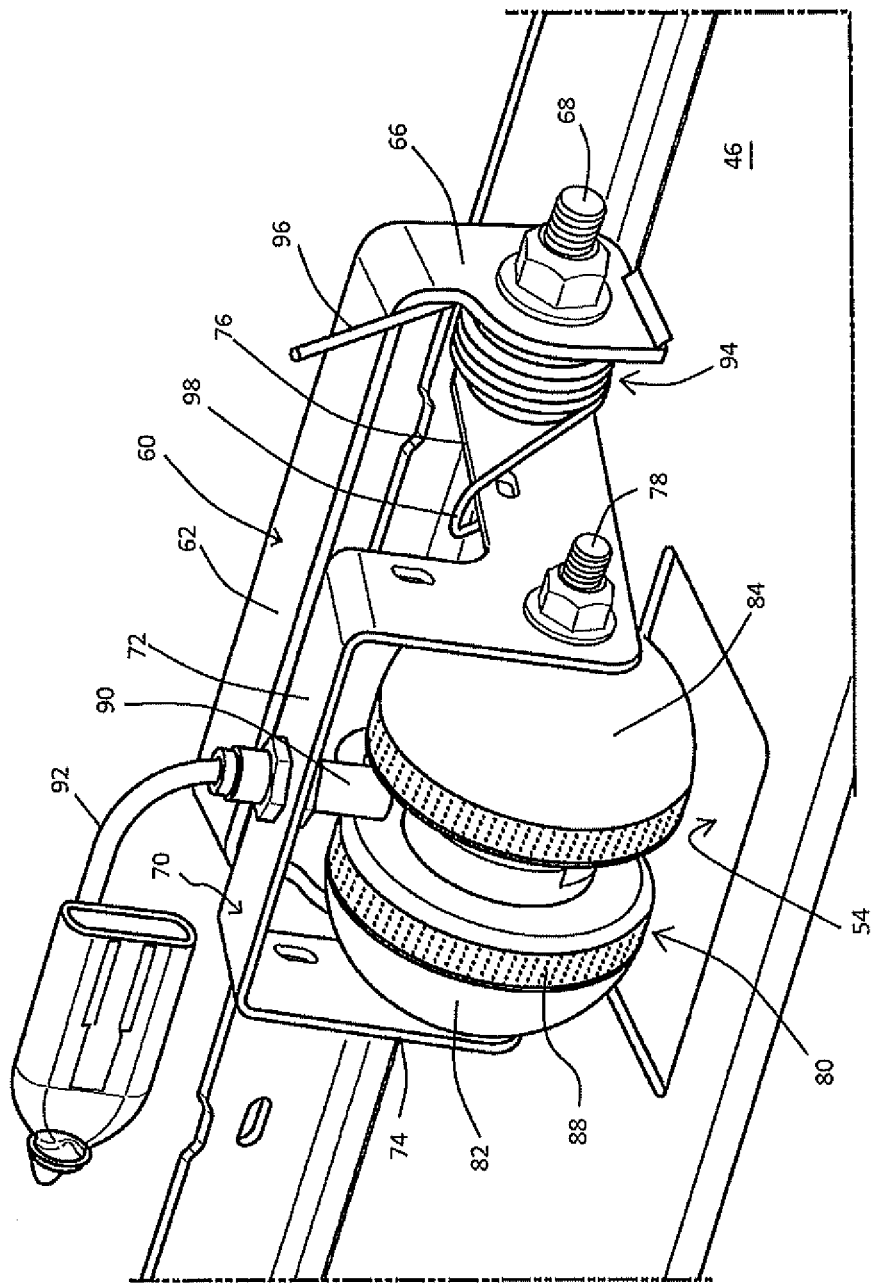
FIG. 4 shows a first perspective view of elements of the sensor arrangement in the second position.
Figure 5:
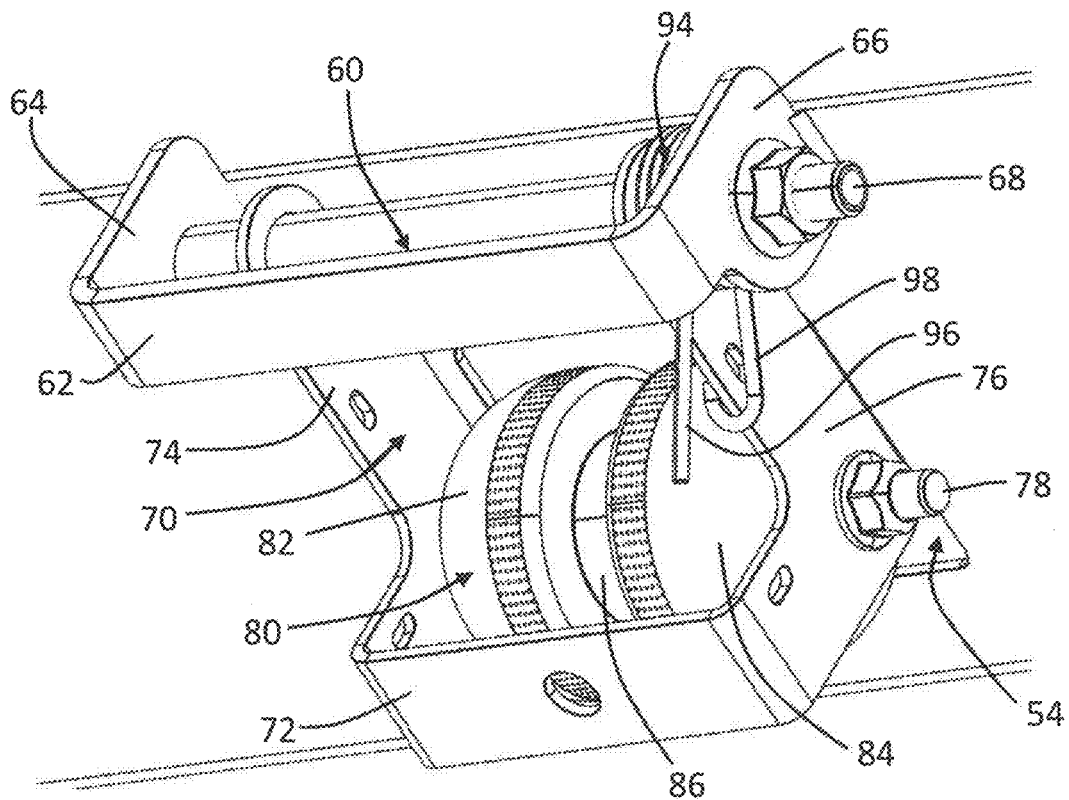
FIG. 5 shows a second perspective view of elements of the sensor arrangement in the first position.

With particular reference to FIGS. 4 and 5, the sensor arrangement 40 is shown mounted to a first bracket 60 fixed on an underside of the second surface 46 of the cradle 42. The first bracket 60 is substantially U shaped comprising a generally linear central portion 62 between first and second side limbs 64,66. Free ends of the first and second side limbs 64,66 of the first bracket 60 are used to secure the first bracket 60 to the cradle 42 in any suitable manner, for example by welding.

A first pin 68 is mounted to extend between the first and second side limbs 64,66 of the first bracket 60. The first pin 68 is mounted to be pivotable about its longitudinal axis or to serve as a bearing about which a further element may be rotated.

A second bracket 70 is substantially U shaped and comprises a generally linear central portion 72 between first and second substantially L-shaped side arms 74,76. The first and second side arms are such that the central portion 72 of the second bracket 70 is offset from free ends of the first and second side arms 74,76.

The free ends of the first and second side arms 74,76 are mounted to the first pin 68 for rotational movement with or about the first pin 68.

A second pin 78 is provided between the first and second side arms 74,76, extending between the respective corners of the L-shaped first and second side arms 74,76. A rotary element 80 is mounted for free rotation about the second pin 78.

In the illustrated element the rotary element 80 comprises two substantially hemispherical portions 82,84 joined by a central connecting portion 86 of diameter less that a diameter of the substantially hemispherical portions 82,84. In the illustrated embodiment, each of the substantially hemispherical portions 82,84 are provided with a surface texture 88. Other constructions of the rotary element are possible, for example the narrower central connecting portion may be substituted with a connecting portion of equal diameter to that of the substantially hemispherical portions. In such an embodiment the surface texture may be provided instead of or additionally to the surface texture provided on the substantially hemispherical portions.

The surface texture 88 may take any suitable form. For example the surface texture 88 may take the form of raised dots, raised ribs, knurling or dimpling.

The sensor arrangement 40 is further provided with a sensor 90 to detect the rotary motion of the rotary element 80. In the illustrated embodiment, the sensor 90 is an electronic sensor mounted to the generally linear central portion 72 of the second bracket 70. The sensor 90 is electronically connected to the electronic control unit 32 in any suitable manner. In the illustrated embodiment a physical connector 92 is show extending from the sensor 90.

Biasing means are provided between the first bracket 60 and the second bracket 70 to bias the second bracket 70 (and so the rotary element 80) with respect to the first bracket 60. In the illustrated element the biasing means takes the form a spring member 94 mounted about the first pin 68 between the first bracket 60 and the second bracket 70. In the illustrated embodiment, a first free end 96 of the spring member 94 abuts the first bracket 60 and a second free end 98 of the spring member is hooked about an upper edge of one of the side arms of the second bracket 70. As can be seen in the illustrated embodiment, the biasing means biases the second bracket 70 such that a portion of the rotary element 80 carried on the second bracket 70 is urged to extend through the window 54 in the second surface 46 of the cradle 42.

Figure 6:
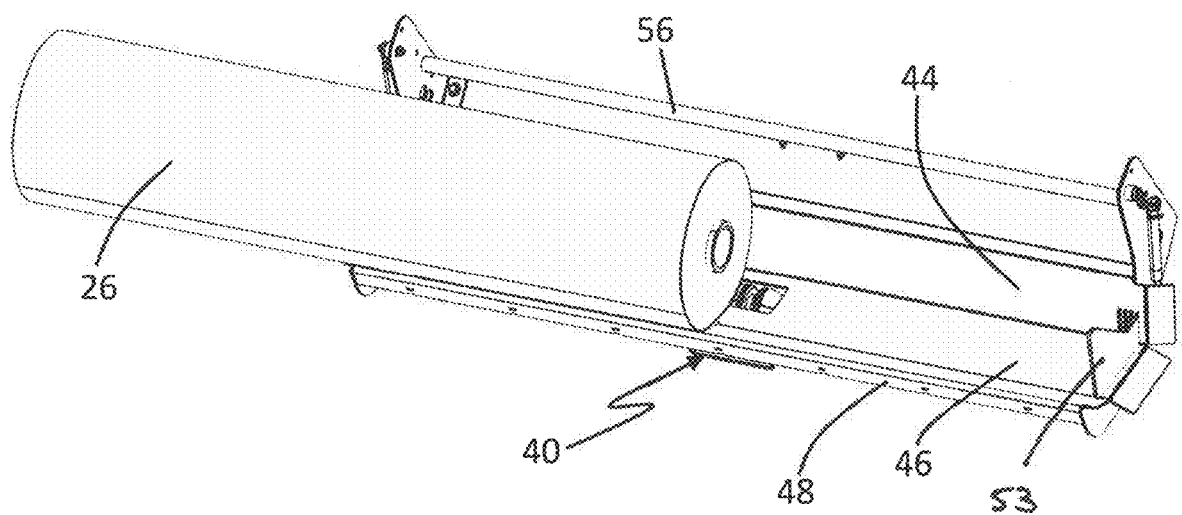
FIG. 6 shows a perspective view of a reel of wrapping material part loaded into the wrapping material reservoir.
Figure 7:
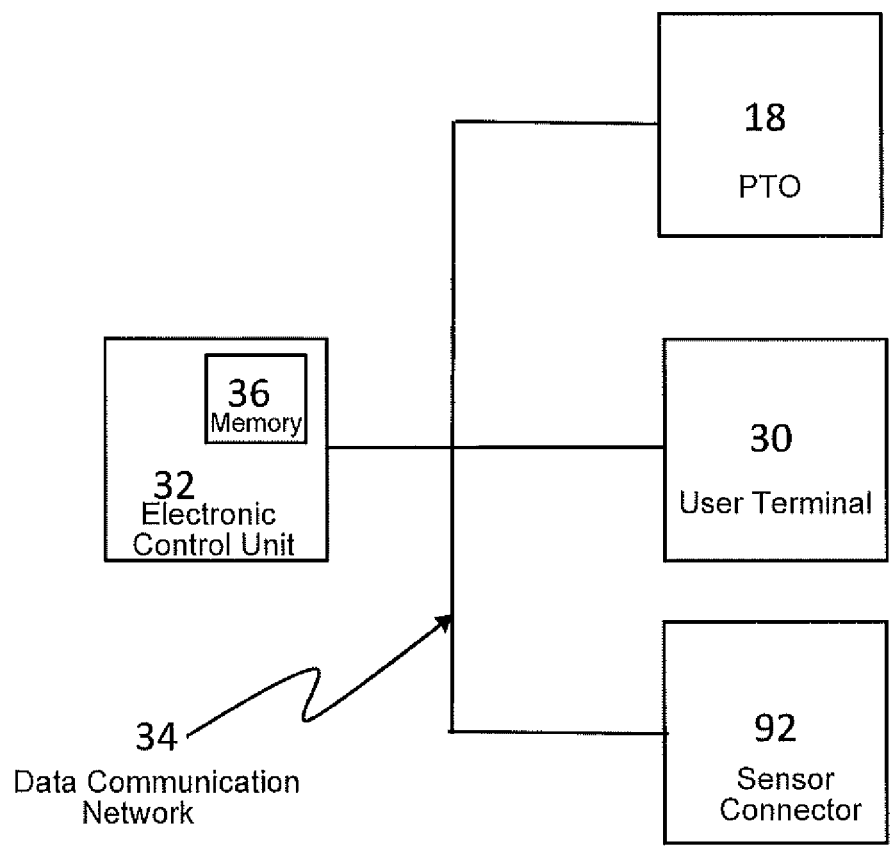
FIG. 7 shows a schematic diagram of the elements of a system incorporating the sensor arrangement of the present invention.
Figure 8:
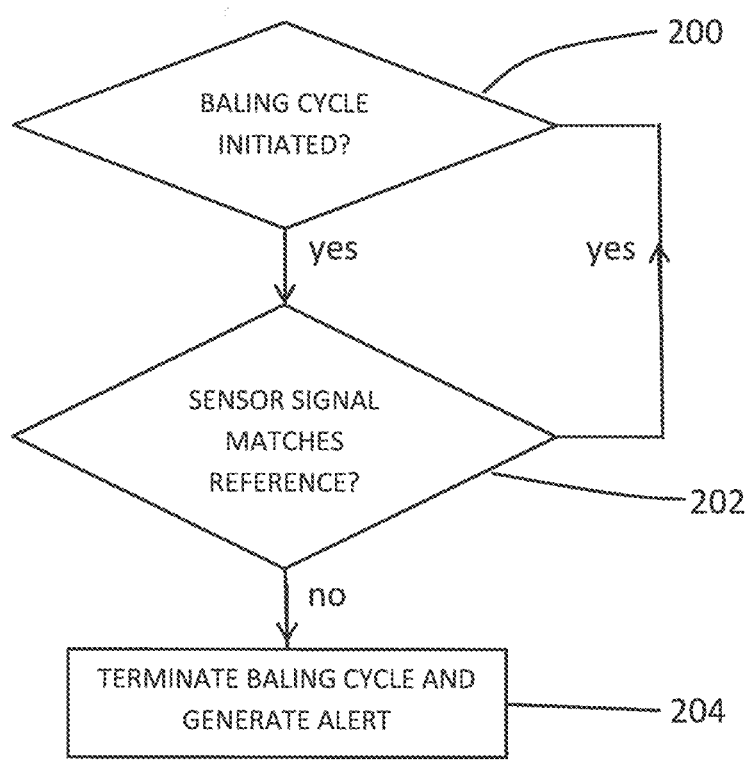
FIG. 8 shows a flow chart illustrating operation of a system incorporating the sensor arrangement of the present invention.

As may be seen from FIG. 6, an operator loads a new reel 26 of wrapping material onto an open end of the cradle 42. The reel 26 of wrapping material is then slid along the cradle. As reel 26 of wrapping material is advanced within the cradle 42 a leading edge of the reel encounters a leading hemispherical surface of the rotary member causing the rotary element 80 to be deflected out of the cradle 42. Further advancing of the reel 26 of wrapping material causes it to abut the closed end of the cradle 42. The reel 26 of wrapping material is now in position to allow correct location of a leading edge of a web of the wrapping material on introduction to the transfer mechanism ready for baling. No additional setting of the sensor arrangement is required by the operator since the rotary element is already urged into an outer surface of the reel 26 of wrapping material in the cradle 42.

It will be understood that contours other than the hemispherical contour of the illustrated embedment that are conducive to sliding or acting like a ramp for the leading edge of the reel 26 of wrapping material to push the rotary element 80 into position may also be used for the rotary element 80.

During the binding operation wrapping material is drawn from the reel 26 of wrapping material causing the reel 26 of wrapping material to rotate about the central spindle 27. Rotation of the reel 26 of wrapping material causes the rotary element 80 to be rotatably driven about the second pin 78 and for such rotation to be detected by the sensor 90. The sensor 90 can then send a confirmatory signal to the electronic control unit 32.

In use, the electronic control unit 32 initiates a binding cycle (step 200) to draw wrapping material from the reservoir. Rotation of the reel 26 of wrapping material causes rotation of the rotary element 80 in turn causing a signal to be sent from the sensor 90 to the electronic control unit 32. The electronic control unit 32 compares the sensor signal to be compared against a reference value stored in the memory 36 (step 202). If the sensor signal corresponds to a reference value indicative of reel rotation the electronic control unit 32 allows the binding cycle to continue in the normal manner.

If no signal (because rotation of the reel 26 of wrapping material has ceased for any reason) or a signal not corresponding to a reference value stored in the memory 36 is received, the electronic control unit 32 will generate a signal causing the binding cycle to cease for example by causing rotation of the baling chamber 20 to cease and an alert signal to be sent to the user terminal 30 to cause the user terminal 30 to alert the operator to the reason for ceasing of the binding cycle (step 204). Alternatively the electronic control unit 32 may only cause the alert signal to be sent to the user terminal 30 to generate an alert indicating the reason that the operator ought to take action to cause the binding cycle to cease. In either case, the alert may take the form of a visual indication, an audible indication or both.

Thus in the case where the supply of wrapping material is exhausted there will no longer be movement of the rotary element. As the supply of wrapping material is consumed the geometry of the rotary element and biased lever arm ensures even, reliable contact with the surface of the reel of wrapping material, even as the diameter of the reel of wrapping material is reduced.

In the illustrated embodiment, relative movement between the spindle of the reel of wrapping material and the sensor arrangement occurs due to the wrapping material being removed from the reel thereby reducing the overall diameter of the reel of wrapping material. However the relative movement will also occur by modification of the degree of displacement of the displaceable mounting bracket towards the reel of wrapping material where the reel spindle is supported by stubs at the side of the wrapping material reservoir.

The present invention has particular utility where the wrapping material takes the form of a plastics mesh, but may also be used where the web of wrapping material takes other forms, for example a plastics film.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A baler comprising:
 a receiving apparatus for receiving a reel of wrapping material, the receiving apparatus including a sensor arrangement for detecting rotation of the reel of wrapping material, the sensor arrangement comprising:
  a displaceable mounting bracket;
  a rotary element mounted for rotation on the displaceable mounting bracket, wherein the rotary element comprises a textured surface; and
  a sensor mounted on the displaceable mounting bracket for detecting rotation of the rotary element; and
 wherein the receiving apparatus further comprises a window and wherein the rotary element extends through the window.

2. The baler of claim 1, wherein the rotary element comprises at least one angled surface.

3. The baler of claim 2, wherein the angled surface comprises a hemispherical element.

4. The baler of claim 1, wherein the textured surface comprises at least one area of surface patterning.

5. The baler of claim 4, wherein the surface patterning comprises at least one area chosen from the following: raised dots, raised ribs, knurling and dimpling.

6. The baler of claim 1, further comprising a fixed mounting bracket supporting the displaceable mounting bracket for movement about an axis.

7. The baler of claim 6, comprising a biasing element acting between the fixed and displaceable mounting brackets.

8. The baler of claim 7, wherein the biasing element biases the displaceable mounting bracket away from the fixed mounting bracket.

9. The baler of claim 1, further comprising:
 an agricultural vehicle for towing the baler.

10. The baler of claim 1, further comprising:
 a control unit;
 memory in communication with the control unit; and
 a user terminal in communication with the control unit,
  wherein the control unit is configured to receive signals from the sensor, compare the received signals against a set of values stored in the memory, and determine whether to generate and send a terminal signal to the user terminal, causing the user terminal to generate an alert.

11. The baler of claim 10, wherein the control unit is further configured to generate and send a baler signal causing operation of the baler to cease when the terminal signal is generated and sent.

* * * * *